(12) United States Patent
Stefanski et al.

(10) Patent No.: US 10,909,832 B2
(45) Date of Patent: *Feb. 2, 2021

(54) THOUGHTFUL ELDERLY MONITORING IN A SMART HOME ENVIRONMENT

(71) Applicant: Google LLC, Mountain View, CA (US)

(72) Inventors: Mark Stefanski, San Francisco, CA (US); Yoky Matsuoka, Los Altos Hills, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/581,926

(22) Filed: Sep. 25, 2019

(65) Prior Publication Data

US 2020/0020220 A1 Jan. 16, 2020

Related U.S. Application Data

(63) Continuation of application No. 15/788,354, filed on Oct. 19, 2017, now Pat. No. 10,467,879.

(51) Int. Cl.
| | | |
|---|---|---|
| *G08B 21/04* | (2006.01) | |
| *G06N 20/00* | (2019.01) | |
| *G08B 13/196* | (2006.01) | |
| *G08B 17/10* | (2006.01) | |
| *G08B 25/08* | (2006.01) | |

(52) U.S. Cl.
CPC ......... *G08B 21/0423* (2013.01); *G06N 20/00* (2019.01); *G08B 13/19613* (2013.01); *G08B 17/10* (2013.01); *G08B 25/08* (2013.01)

(58) Field of Classification Search
CPC ............................ G08B 21/0423; G06N 20/00
USPC ....................................................... 340/573.1
See application file for complete search history.

(56) References Cited

U.S. PATENT DOCUMENTS

| | | | |
|---|---|---|---|
| 9,524,635 B2 | 12/2016 | Fadell et al. | |
| 10,467,879 B2 | 11/2019 | Stefanski et al. | |
| 2009/0259495 A1 | 10/2009 | Rosenfeld | |
| 2013/0201329 A1 | 8/2013 | Thornton et al. | |
| 2014/0266791 A1 | 9/2014 | Lloyd et al. | |
| 2015/0057554 A1 | 2/2015 | Watson et al. | |
| 2015/0156031 A1 | 6/2015 | Fadell et al. | |
| 2015/0372832 A1 | 12/2015 | Kortz et al. | |
| 2016/0260320 A1* | 9/2016 | Fadell | G08C 17/02 |
| 2016/0261932 A1 | 9/2016 | Fadell et al. | |
| 2016/0316256 A1 | 10/2016 | Laska et al. | |
| 2018/0012463 A1 | 1/2018 | Chaudhry et al. | |

* cited by examiner

*Primary Examiner* — Kam Wan Ma

(74) *Attorney, Agent, or Firm* — Kilpatrick Townsend & Stockton LLP

(57) ABSTRACT

Various arrangements are presented for monitoring a resident of a residence. A confidence assessment may be performed based on a plurality of smart home devices in the residence. The residence may be identified as eligible for monitoring of the resident based on the confidence assessment. A learning process may be performed to create an ordinary behavior model. Data that is received from the plurality of smart home devices may be monitored to identify data indicative of behavior considered unusual based on the ordinary behavior model.

18 Claims, 7 Drawing Sheets

THOUGHTFUL ELDERLY MONITORING IN A SMART HOME ENVIRONMENT

CROSS REFERENCE TO RELATED APPLICATIONS

This application is a continuation of U.S. patent application Ser. No. 15/788,354, filed Oct. 19, 2017, the full disclosure of which is incorporated herein by reference.

BACKGROUND

Frequently, adult children live a significant distance from their parents. As the parents age, keeping track of a parent's well-being is often a task that falls to adult children, especially if the parent lives alone. Conventionally, this task is accomplished by frequent telephone calls and emails. Such an arrangement can tend to lead to check-ins with the parent only when convenient to the adult child, check-ins occurring at random times, and/or significant time gaps occurring between check-ins due to when the adult child remembers to check in. Further, such an arrangement may not allow the adult child to truly understand if the parent is in need of help. For instance, the parent may be well enough to conduct a phone call, but his or her behavior off the phone may be erratic, possibly indicative of a physical or mental condition.

SUMMARY

Various embodiments are described related to a method for monitoring a resident. In some embodiments, a method for monitoring a resident is described. The method may include performing a confidence assessment based on a plurality of smart home devices being present within a residence linked with a user account. The resident may reside at the residence. The method may include determining whether the residence is eligible for monitoring of the resident based on the confidence assessment. The method may include performing a learning process over a period of time during which resident activity data is collected from the plurality of smart home devices and analyzed to create an ordinary behavior model. The method may include following determining that the residence is eligible for monitoring of the resident and the learning process being performed, providing a notification that monitoring is active. The method may include monitoring data received from the plurality of smart home devices to identify data indicative of behavior considered unusual based on the ordinary behavior model. The method may include creating an alert that identifies the behavior and identifies how the behavior contrasts with the ordinary behavior model. The method may include sending, to an administrator device linked with the user account, the alert that identifies the behavior and identifies how the behavior contrasts with the ordinary behavior model.

Embodiments of such a method may include one or more of the following features: The method may include performing the confidence assessment. Performing the confidence assessment may include identifying a number of the plurality of smart home devices that are eligible to participate in the monitoring. Performing the confidence assessment may include identifying a second number of the plurality of smart home devices that are eligible to participate in the monitoring and are power-constrained. The method may include, in response to the monitoring being activated, activating a process at each exclusively battery-powered smart home device of the plurality of smart home devices that defines one or more rules indicative of when data indicative of a behavior of the resident should be stored for periodic scheduled transmission to a monitoring server system or the data indicative of the behavior of the resident should be transmitted immediately to the monitoring server system. Performing the confidence assessment may include providing a questionnaire to the administrator device linked with the user account. The questionnaire may require that a user of the administrator device identify a specific location of each smart home device of the plurality of smart home devices within the residence. The questionnaire may require that a user of the administrator device identify a plurality of types of worrisome scenarios of which the user of the administrator device desires to be notified. Performing the confidence assessment may include providing the questionnaire to the administrator device linked with the user account. The questionnaire may require that a user of the administrator device provide an indication of a number of residents that live in the residence. The questionnaire may require that a user of the administrator device provide an indication that no cats or dogs live with the resident. Performing the confidence assessment may include calculating a confidence metric based on the number of the plurality of smart home devices that are eligible to participate in the monitoring. Performing the confidence assessment may include calculating a confidence metric based on the second number of the plurality of smart home devices that are eligible to participate in the monitoring and are power-constrained. Performing the confidence assessment may include calculating a confidence metric based on the responses to the questionnaire received from the administrator device. Performing the confidence assessment may include calculating a confidence metric based on comparing the calculated confidence metric to a confidence metric threshold. The plurality of smart home devices may be selected from the group consisting of: a smart home smoke detector; a smart home carbon monoxide detector; a smart indoor security camera; a smart outdoor security camera; a smart thermostat; a smart home assistant device; a smart security system; a smart window/door sensor; a smartphone; and a smart doorbell device. The plurality of smart home devices may include either a video camera, microphone, or a motion sensor. The method may include outputting, via a smart home device of the plurality of smart home devices, the alert.

In some embodiments, the method may include monitoring the resident using the plurality of smart home devices over a trial period of time to generate a body of trial monitoring data, the trial period of time being sufficient to encompass at least a plurality of daily- and/or day-of-week-specific activity routines of the resident. The method may include processing the trial monitoring data to determine whether the plurality of smart home devices are sufficient in type, number, and location to sufficiently track the resident through their daily- and/or day-of-week-specific activity routines according to a predetermined threshold criterion. The method may include determining that the plurality of smart home devices are not sufficient in at least one of type, number, and location to sufficiently track the resident according to the predetermined threshold criterion, and, responsive to said determining, sending to the administrator device a notification that the residence is not eligible for said monitoring of the resident. The predetermined threshold criterion may include that, for at least a threshold percentage of each day of the trial period, a location of the resident within the residence is identifiable solely using the trial monitoring data. The threshold percentage may be at least 95 percent. The predetermined threshold criterion may include that, for at least the threshold percentage of each day of the trial period, a breathing rate or heartbeat rate of the resident within the residence is identifiable solely using the trial monitoring data. The trial period of time may be a default value of at least seven days, and wherein said performing the confidence assessment is carried out without requiring user input. The trial period of time may be received from a user via the administrative device.

In some embodiments, a system for monitoring a resident is described. The system may include a plurality of smart home devices installed within a residence linked with a user account. The system may include an application executed by an administrator device. The system may include a cloud-based host system. The cloud-based host system may include one or more processors. The cloud-based host system may include a memory communicatively coupled with and readable by the one or more processors. The cloud-based host system, having stored therein processor-readable instructions which, when executed by the one or more processors, may cause the one or more processors to perform a confidence assessment based on the plurality of smart home devices being present within the residence linked with the user account. The resident may reside at the residence. The one or more processors may determine whether the residence is eligible for monitoring of the resident based on the confidence assessment. The one or more processors may perform a learning process over a period of time during which resident activity data is collected from the plurality of smart home devices and analyzed to create an ordinary behavior model. The one or more processors, following determining that the residence is eligible for monitoring of the resident and the learning process being performed, may provide a notification that monitoring is active. The one or more processors may monitor data received from the plurality of smart home devices to identify data indicative of behavior considered unusual based on the ordinary behavior model. The one or more processors may create an alert that identifies the behavior and identifies how the behavior contrasts with the ordinary behavior model. The one or more processors may send, to the administrator device linked with the user account, the alert that identifies the behavior and identifies how the behavior contrasts with the ordinary behavior model. The processor-readable instructions that cause the one or more processors to perform the confidence assessment include processor-readable instructions that may cause the one or more processors to identify a number of the plurality of smart home devices that are eligible to participate in the monitoring. The processor-readable instructions that cause the one or more processors to perform the confidence assessment include processor-readable instructions that may cause the one or more processors to identify a second number of the plurality of smart home devices that are eligible to participate in the monitoring and are power-constrained devices.

Additionally or alternatively, embodiments of such a system may include one or more of the following features: The processor-readable instructions may be configured to cause the one or more processors to, in response to the monitoring being activated, activate a process at each power-constrained smart home device of the plurality of smart home devices that defines one or more rules indicative of when data indicative of a behavior of the resident should be stored for periodic scheduled transmission to a monitoring server system or the data indicative of the behavior of the resident should be transmitted immediately to the monitoring server system. The processor-readable instructions that cause the one or more processors to perform the confidence assessment include processor-readable instructions that may cause the one or more processors to provide a questionnaire to the administrator device linked with the user account. The questionnaire may require that a user of the administrator device identify a specific location of each smart home device of the plurality of smart home devices with the residence. The questionnaire may require that a user of the administrator device identify a plurality of types of worrisome scenarios of which the administrator user desires to be notified. The processor-readable instructions that cause the one or more processors to perform the confidence assessment may include processor-readable instructions that cause the one or more processors to provide the questionnaire to the administrator device linked with the user account. The questionnaire may require that a user of the administrator device provide an indication of a number of residents that live in the residence. The questionnaire may require that a user of the administrator device provide an indication that no cats or dogs live with the resident. The processor-readable instructions that cause the one or more processors to perform the confidence assessment include processor-readable instructions that may cause the one or more processors to calculate a confidence metric based on the number of the plurality of smart home devices that are eligible to participate in the monitoring. The processor-readable instructions may cause the one or more processors to calculate a confidence metric based on the second number of the plurality of the smart home devices that are eligible to participate in the monitoring and are power-constrained. The processor-readable instructions may cause the one or more processors to calculate a confidence metric based on the responses to the questionnaire received from the administrator device. The processor-readable instructions may cause the one or more processors to calculate a confidence metric based on comparing the calculated confidence metric to a confidence metric threshold. The plurality of smart home devices are selected from the group consisting of: a smart home smoke detector; a smart home carbon monoxide detector; a smart indoor security camera; a smart outdoor security camera; a smart thermostat; a smart home assistant device; a smart security system; a smart window/door sensor; a smartphone; and a smart doorbell device. The system may output the alert.

In some embodiments, a non-transitory processor-readable medium comprising processor-readable instructions is described. The processor-readable instructions may cause the one or more processors to perform a confidence assessment based on a plurality of smart home devices being present within a residence linked with a user account. The resident may reside at the residence. The one or more processors may be caused by the instructions to determine whether the residence is eligible for monitoring of the resident based on the confidence assessment. The one or more processors may be caused by the instructions top perform a learning process over a period of time during which resident activity data is collected from the plurality of smart home devices and analyzed to create an ordinary behavior model. The one or more processors, following determining that the residence is eligible for monitoring of the resident and the learning process being performed, may be caused by the instructions to provide a notification that monitoring is active. The one or more processors may be caused by the instructions to monitor data received from the plurality of smart home devices to identify data indicative of behavior considered unusual based on the ordinary behavior model. The one or more processors may be caused by the instructions to create an alert that identifies the behavior and identifies how the behavior contrasts with the ordinary behavior model. The one or more processors may be caused by the instructions to cause to be sent, to an administrator device linked with the user account, the alert that identifies the behavior and identifies how the behavior contrasts with the ordinary behavior model.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Figure 1:
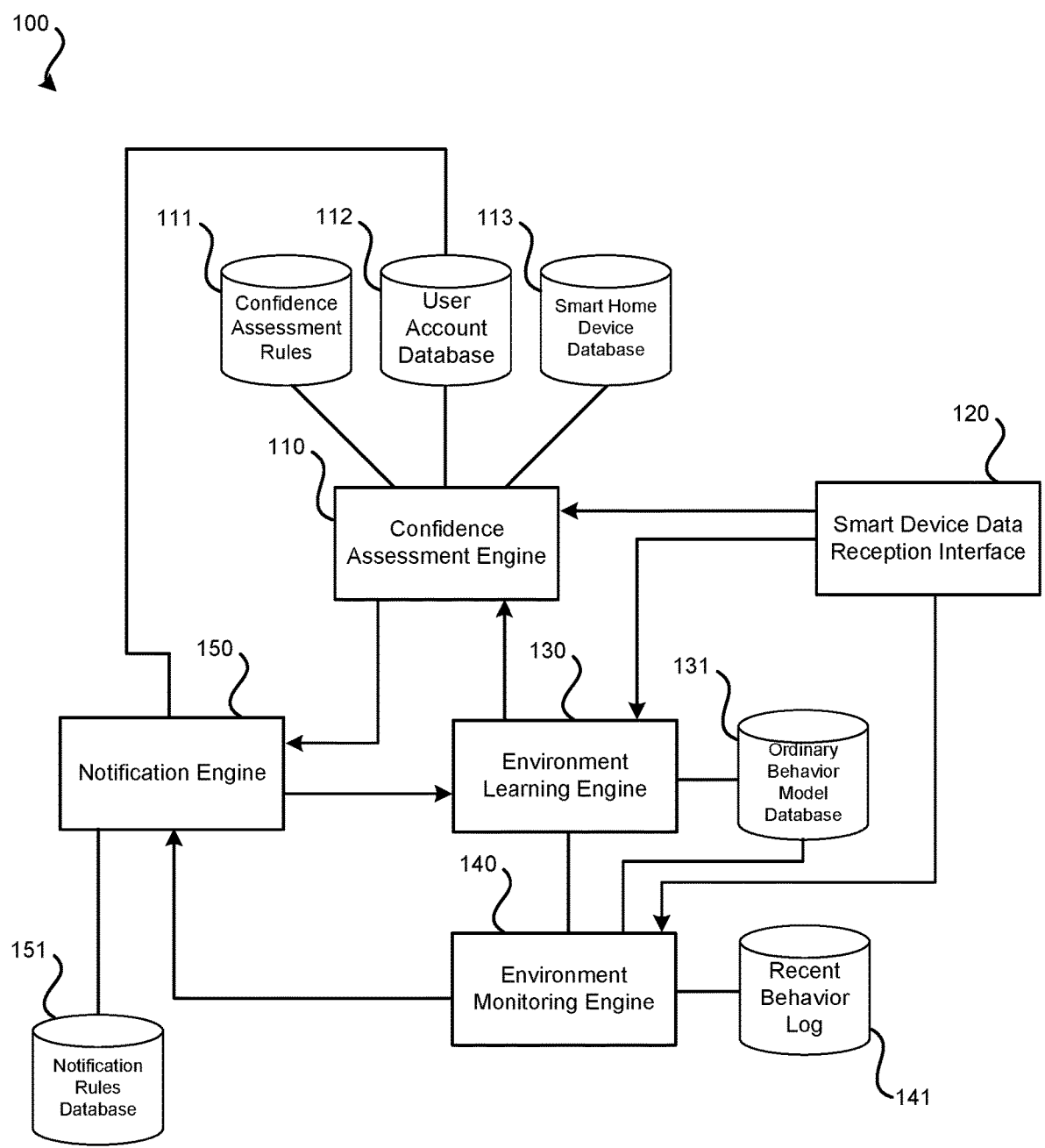
FIG. 1 illustrates an embodiment of a system for performing a confidence assessment of whether smart home devices can effectively monitor an elderly resident and monitoring the elderly resident's daily behavior.

A monitoring arrangement that allows an administrator, such as an adult child, to be made aware of worrisome behavior of a parent may be useful to both the adult child and the parent. The adult child may be provided with peace of mind knowing that her parent is being monitored and that she will receive a notification if the parent's behavior is abnormal. The parent may have peace-of-mind knowing that someone will be alerted if her behavior is out of the ordinary. While the following description focuses on an "administrator," such as an adult child, monitoring a resident of a residence (e.g., an elderly parent) from afar, it should be understood that the arrangements detailed herein can be applied to any form of monitoring of a first person (resident) by a second person (administrator) The following description assumes that, of course, the resident or the resident's legal guardian has granted the administrator authorization to perform such monitoring. For instance, two friends may agree that they should monitor each other since they both live alone and are concerned about falling ill with no one to check on them. As another example, a sister may monitor her brother who lives alone but has a mental, physical, or medical disability.

In order to provide monitoring of a resident, it may be beneficial to avoid installing a suite of specialty sensors in the residence of the resident. Rather, sensors that are already in place or are being used for additional tasks may be used to effect monitoring. For instance, various smart home devices (e.g., smart thermostats, smart smoke detectors, smart carbon monoxide detectors, home assistant devices, smart doorbell devices, indoor security cameras, and outdoor security cameras) may have on-board sensors, such as cameras, motion sensors (e.g., passive infrared sensors), and microphones, that are sufficient to provide some amount of monitoring of the elderly parent.

An initial determination may be made as to whether the smart home devices installed at the residence of the resident are sufficient to provide monitoring of the resident. This initial determination may be a confidence assessment that is used to determine whether the data received from the smart home devices is sufficient to monitor the behavior of the resident with at least a threshold level of confidence. While such a system may not be designed for medical monitoring (e.g., to provide immediate access to emergency medical care), the administrator, such as the adult child, may desire a low number of false positives on abnormal behavior of the resident, such as the parent. As such, the system must be able to assess the resident's behavior with a high degree of confidence.

If the confidence assessment indicates that the smart home devices within the residence of the resident are sufficient to monitor the resident's behavior with a high degree of accuracy, an ordinary behavior model (OBM) may be created that details the resident's typical daily behavior pattern. The resident's daily activity may be compared to the OBM to determine if the resident's activity is sufficiently different from the OBM to warrant the administrator being notified. For example, the OBM may detail a time period during the day during which at least some motion is typically detected (e.g., from 9 AM-7 PM). The administrator may only be notified for sufficiently worrisome behavior, which may include specific behaviors that the administrator has identified as concerning and is sufficiently different from the behavior indicated in the OBM. For instance, no movement may occur during the entire time period. If the administrator is to be notified of unusual behavior by the resident, a notification may be sent to the administrator indicative of the unusual behavior and, possibly, a comparison with the typical behavior indicated in the OBM. For instance, a notification may state: "No movement has been detected at the home of [Resident], which is out of the ordinary. Touch here to learn further details."

Additional detail regarding such arrangements is provided in relation to the Figures. FIG. 1 illustrates an embodiment of a system for performing a confidence assessment of whether smart home devices can effectively monitor a resident and for monitoring the resident's daily behavior. System 100 may be composed of one or more computer server systems and may include: confidence assessment engine 110, confidence assessment rules 111, user account database 112, smart home device database 113, smart device data reception interface 120, environment learning engine 130, ordinary behavior model database 131, environment monitoring engine 140, recent behavior log 141, and notification engine 150. The various components of system 100 may be implemented using one or more computer server systems. The various engines described in relation to system 100 may be implemented using stored instructions executed by one or more general-purpose processors. Alternatively, one or more special purpose processors may be configured to perform the functions of the various engines of system 100. The various databases and logs may be stored using one or more non-transitory computer readable mediums, such as memory, hard drives, and/or solid state drives.

Confidence assessment engine 110 may receive data from smart device data reception interface 120 and may access various databases including: confidence assessment rules 111, user account database 112, and smart home device database 113. Confidence assessment engine 110 may determine whether sufficient data and consistent enough data is received from smart device data reception interface 120 in order for system 100 to provide sufficiently accurate monitoring of a resident living in a residence. Confidence assessment engine 110 may determine a level of confidence by assessing various factors including: the number of smart home devices installed in the residence that can provide monitoring services; the type of monitoring sensors available in the smart home devices installed in the residence (e.g., video cameras, passive infrared sensors, microphones), the number of smart home devices that are exclusively powered by battery (which may have stringent power requirements and may not be able to perform wireless communication as frequently as a line powered smart home device), the specific location of the smart home devices in relation to the resident being monitored (e.g., within the bedroom in which the resident sleeps, in a kitchen used by the resident daily), the size of the residence being monitored, whether the resident has a smart phone typically carried on the resident's body, the answers to a questionnaire provided either to the administrator and/or the resident, and/or the consistency of data received from smart devices data reception engine 120 during a learning time period. A confidence metric may be calculated and compared to a threshold based on at least some of the above factors. If the metric exceeds a threshold value, the residence may be eligible for monitoring of the resident. Certain factors may make the confidence metric irrelevant. For example, various "if-else" logic may be used to disqualify a resident or residence from monitoring. For example, if the resident does not have a smartphone, the resident may be disqualified from monitoring regardless of the calculated metric.

Confidence assessment engine 110 may provide data to notification engine 150 indicative of whether or not a sufficiently high confidence is present that system 100 could accurately monitor the behavior of an elderly resident residing at the residence. If not, notification engine 150 may cause the ability to enable elderly monitoring to be disabled, such as in an application executed on a mobile device of an administrator. If the confidence is sufficiently high, such as a calculated confidence metric is greater than a stored threshold, elderly monitoring may be enabled or an option to enable such elderly monitoring may be provided to the administrator.

Confidence assessment rules 111 may be a set of rules that are used to evaluate the smart home devices present at the residence to be monitored and to evaluate responses to a questionnaire provided by either the resident or the administrator, such as via an application executed by a mobile device. Using confidence assessment rules 111, a confidence metric may be calculated. If the metric is at least a threshold value, monitoring may be available; otherwise, it may not be available. Examples of various rules which may be a part of confidence assessment rules 111 can include: Is at least one non-battery powered smart device monitoring a location frequented by the resident within the residence? If the answer is no, no further assessment may be performed and monitoring may not be available. Another rule may involve determining what is the number of smart home devices present in the residence? The metric score may be increased based on the number of devices present. If at least a threshold number (e.g., 2) of devices is not present, monitoring may not be available.

User account database 112 may store indications of various user accounts that are linked with smart home devices indicated in smart home device database 113. Each smart home device of a particular manufacturer or that is compatible with a particular standard may require to be registered with system 100. As part of registration, the smart home device may be linked with a particular user account. A user account may be linked with some number of smart devices, a user name, and a password. Accessing the user account, such as from an application or web-based login, may provide access to data gathered from the various smart devices linked with the user account. Each smart home device present at a residence to be monitored may be linked with a user account of the elderly resident. Each administrator, such as an adult child, that may be planning on monitoring a resident may have her own account (which may or may not also be linked with other smart home devices). This account may be linked with the resident's account for monitoring purposes based upon the resident providing consent to monitoring via an authorization process, which may be offered through an application executed by the resident's mobile device (e.g., smartphone).

Smart home device database 113 may be linked with user account database 112 such that an identifier of each smart home device (e.g., MAC address) is linked with a user account of user account database 112. In some embodiments, these two databases may be a single database. The smart home device database 113 may link a particular smart home device to data gathered from the smart home device and, possibly, processed by system 100 or some other system. For example, sensor data gathered from a smart home device may be used to determine if a person was at home at a given time. This indication of the person being home or away may be stored in smart home device database 113 or otherwise linked to the smart home device and linked user account.

Smart devices data reception interface 120 may serve to receive data from various types of smart home devices for storage and for processing. Data received by smart device data reception interface 120 may be stored in relation to the linked user account and/or in relation to the particular smart home device as part of smart home device database 113. Data received by smart device data reception interface 120 may be used by confidence assessment engine 110 in performing the confidence assessment. Data received by smart device data reception interface 120 may be assessed by confidence assessment engine 110 for repeating patterns present in the data indicative of the resident's behavior. For instance, a resident being detected as rising from bed within a given time range each day (e.g., a hour or two hour range) may increase the confidence metric, but if the resident is erratic in his sleeping pattern (e.g., rising from bed at a variety of times that exceed the one or two hour range) when the confidence assessment is being performed, the confidence metric may be decreased or not increased.

Environment learning engine 130 may use data from smart device data reception interface 120 to create an ordinary behavior model for a residence and the resident who lives at the residence. Sensor data received by smart device data reception interface 120 from smart home devices present within the resident's residence may be monitored for a: wake-up time period (a time period during which there is a high likelihood (i.e., x % chance) that the resident gets out of bed); a bedtime time period (a time period during which there is a high likelihood (i.e., x % chance) that the resident goes to bed); and/or an activity interval (an amount of time during which movement by the resident is expected to be observed at least a threshold number of times (e.g., movement at least once per hour between the wake-up time period and the bedtime time period). The higher the percent chance set by the administrator or predefined at system 100, the greater the time period may be in duration, which may decrease the number of false positives of worrisome behavior, but may result in some delayed or missed instances of worrisome behavior.

Environmental learning engine 130 may use location data gathered from a smartphone, cellular phone, or other electronic device that the resident typically carries when leaving the residence to determine when the resident has left and/or returned to the residence. Most residents, for example, may be expected to bring a phone with them if they leave home. The times that the resident leaves, the duration of time for which the resident is gone, and the times that the resident returns to the residence (or a geo-fenced region encompassing the residence) may be used to create the OBM.

An OBM may be created over a period of time, such as a month. This OBM may include data such as the wake-up time period, the bedtime time period, and an activity interval. Of course, other behavioral patterns may be stored as part of the OBM. Various behavioral patterns may be monitored by environment learning engine 130 based on which smart home devices are present at the residence. For instance, the OBM may include an indication of how often a resident leaves a residence if an outdoor security camera or smart doorbell device is present to monitor persons entering and exiting the residence. The outdoor behavior model created by environment learning engine 130 may be stored to ordinary behavior model database 131 and may be linked with the resident via the resident's user account or the administrator's account. Environment learning engine 130 may continue to observe and update the OBM based on the resident's behavior over time. For instance, if over time the resident's bedtime becomes earlier, the bedtime time period may be shifted to reflect this earlier bedtime that has changed slowly over time.

In some embodiments, environment learning engine 130 may only be activated following confidence assessment engine determining that the residence can be monitored with a high degree of confidence. In other embodiments, environment learning engine 130 may attempt to create an ordinary behavior model for the elderly resident living at the residence prior to the confidence metric being computed by confidence assessment engine 110. If a repeated pattern of behavior is observed by environment learning engine 130, data may be provide by environment learning engine 130 to confidence assessment engine 110 that increases the confidence metric. If the behavior observed by environmental learning engine 130 does not correlate closely to a pattern, data may be provided by environment learning engine 130 to confidence assessment engine 110 that does not increase the confidence metric or decreases the confidence metric.

Once an ordinary behavior model has been created and monitoring has been enabled due to the confidence assessment exceeding a threshold confidence value, environment monitoring engine 140 may monitor the resident's behavior within the residence to determine if it complies with the ordinary behavior model for the resident stored within ordinary behavior model database 131. Environment monitoring engine 140 may maintain a recent behavior log 141 that reflects recent behavior of the resident, such as the resident's recent actions within the last day or week. Environment monitoring engine 140 may receive data from smart device data reception interface 120 and may monitor this data to determine when particular behaviors has been performed by the resident, such as when the resident has risen from bad, when has the resident most recently been active, and when has the resident gone to bed. These behaviors may be compared with the ordinary behavior model stored as part of the ordinary behavior model database 131. If the behavior exceeds a time period for the behavior specified within the OBM or the behavior exceeds the time period specified by the OBM by more than a threshold amount (e.g., an hour), the behavior may be a candidate for notification to an administrator, such as an adult child.

Notification engine 150 may serve to communicate with the administrator and the resident. Notification engine 150 may access user account database 112 to determine an administrator to notify if there is abnormal behavior by a resident. Notification engine 150 may output a notification in response to a behavior determined to be abnormal based on the behavior being outside of the OBM for the resident. Such a notification may include an indication of the abnormal behavior and a comparison with the OBM. The notification may be provided to the administrator in the form of a push notification and/or message within an application executed by a mobile device of the administrator. Notification engine 150 may have access to notification rules database 151. Notification rules database 151 may be used to determine when an administrator is to be notified. For instance, an administrator may customize which situations he believes are worrisome. For example, an administrator may not wish to be notified about periods of inactivity, but may wish to be notified if the resident's bedtime or wake time is outside of norms. Therefore, notification rules of notification rules database 151 may be linked with a particular user account of user account database 112. In some embodiments, a notification to be sent to an administrator is first sent to a device of the resident. If the resident does not respond within a defined time period or provides an unsatisfactory answer, the notification may be sent by notification engine 150 to the administrator.

System 100 may be implemented as part of a cloud-based server system that is remote from either the residence of the resident or the administrator. Alternatively, some or all of the functionality of system 100 may be implemented locally by one or more devices located at the residence. For instance, a smart home device (e.g., a home assistant) that performs some of the monitoring of the resident may have system 100 incorporated as part of it. System 100 may be incorporated as any of the smart home devices detailed in relation to smart-home environment 200 or may be part of cloud-computing system 264.

Figure 2:
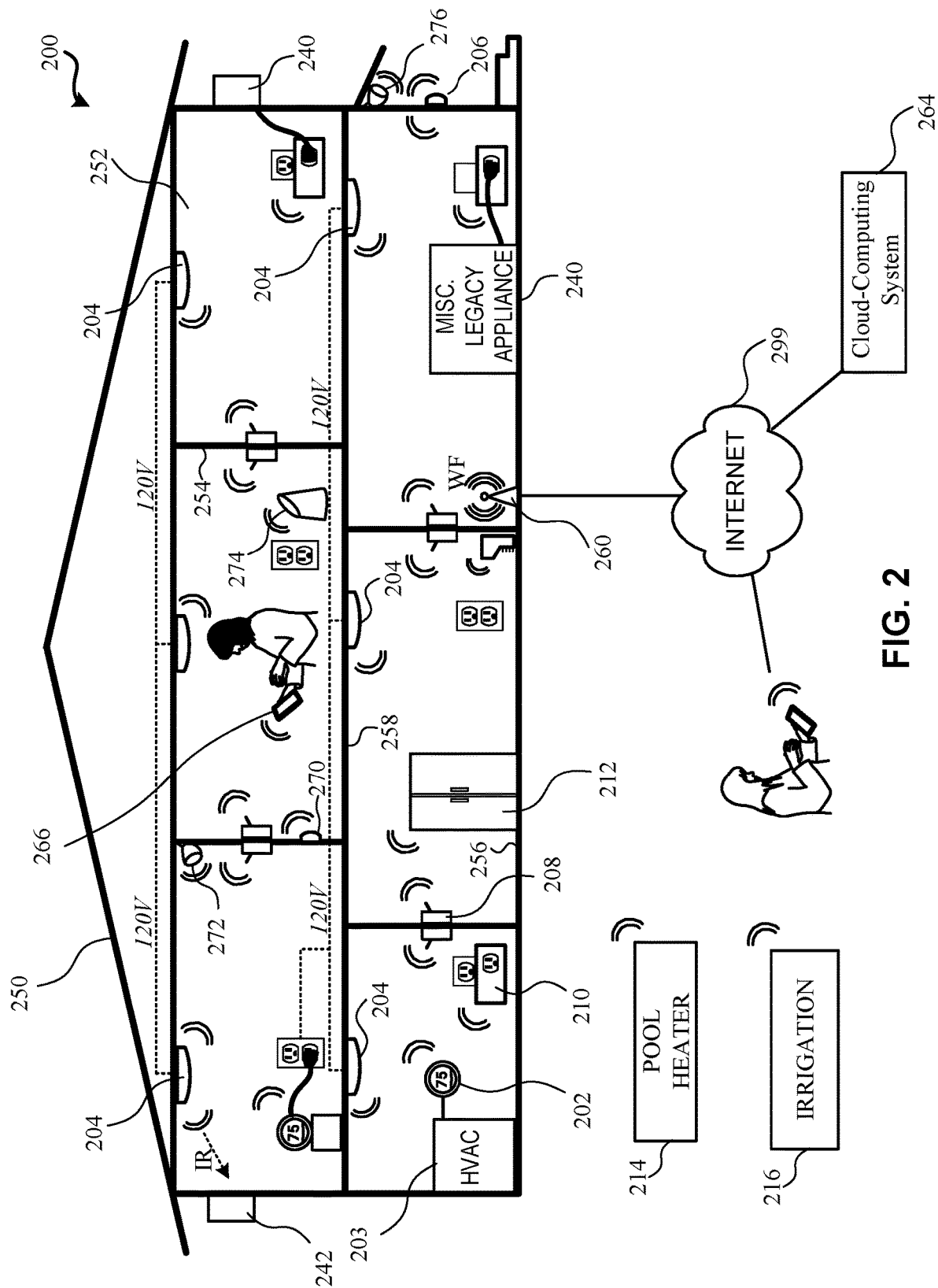
FIG. 2 illustrates an embodiment of a smart-home environment.

FIG. 2 illustrates an embodiment of a smart-home environment. FIG. 2 illustrates an example of a smart-home environment 200 with which system 100 may interact to learn the behaviors of a resident and monitor the resident. In some embodiments, it may be required that the resident live alone. In other embodiments, the sensors may be robust enough that multiple residents can be disambiguated. Environment 200 can reflect a residence in which a resident lives and is being monitored by various sensors present on smart home devices. The depicted smart-home environment 200 includes a structure 250, which can include, e.g., a house, office building, garage, or mobile home. It will be appreciated that devices can also be integrated into a smart-home environment 200 that does not include an entire structure 250, such as an apartment unit, condominium, townhome, or office space. Further, the smart home environment can control and/or be coupled to devices outside of the actual structure 250. Indeed, several devices in the smart home environment need not physically be within the structure 250 at all. For example, a device controlling a pool heater or irrigation system can be located outside of the structure 250.

The depicted structure 250 includes a plurality of rooms 252, separated at least partly from each other via walls 254. The walls 254 can include interior walls or exterior walls. Each room can further include a floor 256 and a ceiling 258. Smart home devices can be mounted on, integrated with and/or supported by a wall 254, floor 256 or ceiling 258.

In some embodiments, the smart-home environment 200 of FIG. 2 includes a plurality of devices, including intelligent, multi-sensing, network-connected devices, that can integrate seamlessly with each other and/or with a central server or a cloud-computing system to provide any of a variety of useful smart-home objectives. The smart-home environment 200 may include one or more intelligent, multi-sensing, network-connected thermostats 202 (hereinafter referred to as "smart thermostats 202"), one or more intelligent, network-connected, hazard detectors 204, and one or more intelligent, multi-sensing, network-connected entryway interface devices 206 (hereinafter referred to as "smart doorbells 206"). According to embodiments, the smart thermostat 202 detects ambient climate characteristics (e.g., temperature and/or humidity) and controls a HVAC system 203 accordingly. The hazard detector 204 may detect the presence of a hazardous substance or a substance indicative of a hazardous substance (e.g., smoke, fire, or carbon monoxide). Smart thermostats 202 and hazard detector 204 may each also detect occupancy, such as by using one or more on-board passive infrared sensors. The smart doorbell 206 may detect a person's approach to or departure from a location (e.g., an outer door) using a camera and/or passive infrared (PIR) sensor, control doorbell functionality, announce a person's approach or departure via audio or visual means, or control settings on a security system (e.g., to activate or deactivate the security system when occupants go and come).

In some embodiments, the smart-home environment 200 of FIG. 2 further includes one or more intelligent, multi-sensing, network-connected wall switches 208 (hereinafter referred to as "smart wall switches 208"), along with one or more intelligent, multi-sensing, network-connected wall plug interfaces 210 (hereinafter referred to as "smart wall plugs 210"). The smart wall switches 208 may detect ambient lighting conditions, detect actuation, detect room-occupancy states (e.g., movement of a resident), and control a power and/or dim state of one or more lights. In some instances, smart wall switches 208 may also control a power state or speed of a fan, such as a ceiling fan. The smart wall plugs 210 may detect occupancy of a room or enclosure and control supply of power to one or more wall plugs (e.g., such that power is not supplied to the plug if nobody is at home).

Still further, in some embodiments, the smart-home environment 200 of FIG. 2 includes a plurality of intelligent, multi-sensing, network-connected appliances 212 (hereinafter referred to as "smart appliances 212"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 212 are made compatible with the smart-home environment by cooperating with the respective manufacturers of the appliances. Such smart appliances may be able to detect movement in their vicinity and/or interactions with the smart appliances by a resident. For example, the appliances can be space heaters, window AC units, motorized duct vents, etc. When plugged in, an appliance can announce itself to the smart-home network, such as by indicating what type of appliance it is, and it can automatically integrate with the controls of the smart-home. Such communication by the appliance to the smart home can be facilitated by any wired or wireless communication protocols known by those having ordinary skill in the art. The smart home also can include a variety of non-communicating legacy appliances 240, such as old conventional washer/dryers, refrigerators, and the like which can be controlled, albeit coarsely (ON/OFF), by virtue of the smart wall plugs 210. The smart-home environment 200 can further include a variety of partially communicating legacy appliances 242, such as infrared ("IR") controlled wall air conditioners or other IR-controlled devices, which can be controlled by IR signals provided by the hazard detectors 204 or the smart wall switches 208.

According to embodiments, the smart thermostats 202, the hazard detectors 204, the smart doorbells 206, the smart wall switches 208, the smart wall plugs 210, and other devices of the smart-home environment 200 are modular and can be incorporated into older and new houses. For example, the devices are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors, processors, user interfaces, the batteries, and other functional components of the devices.

In some embodiments, one or more smart indoor security cameras may be present such as indoor security camera 272. Indoor security camera 272 may wirelessly communicate with a cloud server system to capture and record video and audio. Indoor security camera 272 may be able to detect motion, recognize a resident (e.g., via facial detection), and detect the presence of a resident or other person via audio (e.g., detection of a human voice). Indoor and outdoor security cameras may be used to determine when a resident leaves home (for example, an OBM behavior may be a time range during the day when a resident typically leaves home, such as between 8 AM and 6 PM) or returns home. In some embodiments, as previously detailed, this data may be supplemented with location data derived from an electronic device, such as a smartphone, that a resident typically carries when going out. If the smartphone is forgotten by the resident, data from the cameras may be used to determine that the smartphone has been left behind and the resident has left the residence (e.g., a camera detects the resident leaving, the smartphone remains stationary in the residence, and there is no movement detected within the residence for a threshold period of time). When the environment is darkened, indoor security camera 272 may use infrared to detect the presence of a resident and/or other persons in the camera's field-of-view.

In some embodiments, one or more smart outdoor security cameras may be present such as outdoor security camera 276. Outdoor security camera 276 may wirelessly communicate with a cloud server system to capture and record video and audio and may function similarly to indoor security camera 272. Outdoor security camera 276 may include weatherproofing to protect against the outdoor environment. Outdoor security camera 276 may be able to detect motion, recognize a resident (e.g., via facial detection), and detect the presence of a resident or other person via audio (e.g., detection of a human voice). At night, outdoor security camera 276 may use infrared to detect the presence of a resident and/or other persons in the camera's field-of-view.

In some embodiments, one or more home assistant devices may be present in the residence, such as home assistant device 274. Home assistant device 274 may include one or more microphones. Home assistant device 274 may detect and analyze human speech and may be able to detect speech and/or movement by the resident. Further, home assistant device 274 may be able to make inquiries of the resident. For instance, if the resident has not been detected as moving in a predefined period of time by any of the smart home devices within the residence, home assistant device 274 may ask "[Resident], are you OK?" If no response is received, this may trigger a notification being sent to an administrator.

The smart-home environment 200 may also include communication with devices outside of the physical home but within a proximate geographical range of the home. For example, the smart-home environment 200 may include a pool heater monitor 214 that communicates a current pool temperature to other devices within the smart-home environment 200 or receives commands for controlling the pool temperature. Similarly, the smart-home environment 200 may include an irrigation monitor 216 that communicates information regarding irrigation systems within the smart-home environment 200 and/or receives control information for controlling such irrigation systems. According to embodiments, an algorithm is provided for considering the geographic location of the smart-home environment 200, such as based on the zip code or geographic coordinates of the home. The geographic information is then used to obtain data helpful for determining optimal times for watering; such data may include sun location information, temperature, due point, soil type of the land on which the home is located, etc. These devices may be able to detect and report input provided by a resident.

By virtue of network connectivity, one or more of the smart-home devices of FIG. 2 can further allow a resident to interact with the device even if the resident is not proximate to the device. For example, a resident can communicate with a device using a computer (e.g., a desktop computer, laptop computer, or tablet) or other portable electronic device (e.g., a smartphone) 266. A webpage or app can be configured to receive communications from the resident and control the device based on the communications and/or to present information about the device's operation to the resident. For example, the resident can view a current setpoint temperature for a device and adjust it, using a computer. The resident can be in the structure during this remote communication or outside the structure.

As discussed, users can control and interact with the smart thermostat, hazard detectors 204, and other smart devices in the smart-home environment 200 using a network-connected computer or portable electronic device 266. In some examples, some or all of the residents (e.g., individuals who live in the home) can register their electronic device 266 with the smart-home environment 200. Such registration can be made at a cloud-based server (as detailed in relation to system 100) to authenticate the resident and/or the device as being associated with the home and to give permission to the resident to use the device to control the smart devices in the home. A resident can use their registered electronic device 266 to remotely control the smart devices of the home, such as when the resident is at work or on vacation. The resident may also use their registered device to control the smart devices when the resident is actually located inside the home, such as when the resident is sitting on a couch inside the home. It should be appreciated that, instead of or in addition to registering electronic devices 266, the smart-home environment 200 makes inferences about which individuals live in the home and are therefore residents and which electronic devices 266 are associated with those individuals. As such, the smart-home environment "learns" who is an resident and permits the electronic devices 266 associated with those individuals to control the smart devices of the home.

In some embodiments, in addition to containing processing and sensing capabilities, each of the devices 202, 204, 206, 208, 210, 212, 214, 216, 272, 274, and 276 (collectively referred to as "the smart devices") is capable of data communications and information sharing with any other of the smart devices, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices can serve as wireless or wired repeaters. For example, a first one of the smart devices can communicate with a second one of the smart devices via a wireless router 260. The smart devices can further communicate with each other via a connection to a network, such as the Internet 299. Through the Internet 299, the smart devices can communicate with a cloud-computing system 264, which can include one or more centralized or distributed server systems. The cloud-computing system 264 can be associated with a manufacturer, support entity, or service provider associated with the device. For one embodiment, a user may be able to contact customer support using a device itself rather than needing to use other communication means such as a telephone or Internet-connected computer. Further, software updates can be automatically sent from cloud-computing system 264 to devices (e.g., when available, when purchased, or at routine intervals).

According to embodiments, the smart devices combine to create a mesh network of spokesman and low-power nodes in the smart-home environment 200, where some of the smart devices are "spokesman" nodes and others are "low-powered" nodes. Some of the smart devices in the smart-home environment 200 are battery powered, while others have a regular and reliable power source, such as by connecting to wiring (e.g., to 120 V line voltage wires) behind the walls 254 of the smart-home environment. The smart devices that have a regular and reliable power source are referred to as "spokesman" nodes. These nodes are equipped with the capability of using any wireless protocol or manner to facilitate bidirectional communication with any of a variety of other devices in the smart-home environment 200 as well as with the cloud-computing system 264. On the other hand, the devices that are battery powered are referred to as "low-power" nodes. These nodes tend to be smaller than spokesman nodes and can only communicate using wireless protocols that require very little power, such as ZigBee, 6LoWPAN, etc. Further, some, but not all, low-power nodes are incapable of bidirectional communication. These low-power nodes send messages, but they are unable to "listen". Thus, other devices in the smart-home environment 200, such as the spokesman nodes, cannot send information to these low-power nodes.

As described, the smart devices serve as low-power and spokesman nodes to create a mesh network in the smart-home environment 200. Individual low-power nodes in the smart-home environment regularly send out messages regarding what they are sensing, and the other low-powered nodes in the smart-home environment—in addition to sending out their own messages—repeat the messages, thereby causing the messages to travel from node to node (i.e., device to device) throughout the smart-home environment 200. The spokesman nodes in the smart-home environment 200 are able to "drop down" to low-powered communication protocols to receive these messages, translate the messages to other communication protocols, and send the translated messages to other spokesman nodes and/or cloud-computing system 264. Thus, the low-powered nodes using low-power communication protocols are able to send messages across the entire smart-home environment 200 as well as over the Internet 263 to cloud-computing system 264. According to embodiments, the mesh network enables cloud-computing system 264 to regularly receive data from all of the smart devices in the home, make inferences based on the data, and send commands back to one of the smart devices to accomplish some of the smart-home objectives described herein.

As described, the spokesman nodes and some of the low-powered nodes are capable of "listening." Accordingly, users, other devices, and cloud-computing system 264 can communicate controls to the low-powered nodes. For example, a user can use the portable electronic device (e.g., a smartphone) 266 to send commands over the Internet to cloud-computing system 264, which then relays the commands to the spokesman nodes in the smart-home environment 200. The spokesman nodes drop down to a low-power protocol to communicate the commands to the low-power nodes throughout the smart-home environment, as well as to other spokesman nodes that did not receive the commands directly from the cloud-computing system 264.

An example of a low-power node is a smart nightlight 270. In addition to housing a light source, the smart nightlight 270 houses an occupancy sensor, such as an ultrasonic or passive IR sensor, and an ambient light sensor, such as a photo-resistor or a single-pixel sensor that measures light in the room. Such a nightlight 270 may be able to detect when a resident moves nearby. In some embodiments, the smart nightlight 270 is configured to activate the light source when its ambient light sensor detects that the room is dark and when its occupancy sensor detects that someone is in the room. In other embodiments, the smart nightlight 270 is simply configured to activate the light source when its ambient light sensor detects that the room is dark. Further, according to embodiments, the smart nightlight 270 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment 200 as well as over the Internet 299 to cloud-computing system 264.

Other examples of low-powered nodes include battery-operated versions of the hazard detectors 204. These hazard detectors 204 are often located in an area without access to constant and reliable (e.g., structural) power and, as discussed in detail below, may include any number and type of sensors, such as smoke/fire/heat sensors, carbon monoxide/dioxide sensors, occupancy/motion sensors, ambient light sensors, temperature sensors, humidity sensors, and the like. Furthermore, hazard detectors 204 can send messages that correspond to each of the respective sensors to the other devices and cloud-computing system 264, such as by using the mesh network as described above.

Examples of spokesman nodes include smart doorbells 206, smart thermostats 202, smart wall switches 208, and smart wall plugs 210. These devices 202, 206, 208, and 210 are often located near and connected to a reliable power source, and therefore can include more power-consuming components, such as one or more communication chips capable of bidirectional communication in any variety of protocols.

According to one embodiment, the user can be provided with a suite of related smart-home devices, such as may be provided by a common manufacturer or group or badged to work with a common "ecosystem" of that manufacturer or group, wherein each of the devices, where practicable, provides a same or similarly triggered illumination-based notification scheme and theme, such that the user can be readily familiar with the status signals emitted by the variety of different devices without needing to learn a different scheme for each device. Thus, by way of example, there can be provided a suite of devices including a security/automation hub, multiple door/window sensors, and multiple hazard detectors, wherein each such device has a circular illumination ring that conveys triggered visual information according to the themes and schemes described herein.

Figure 3:
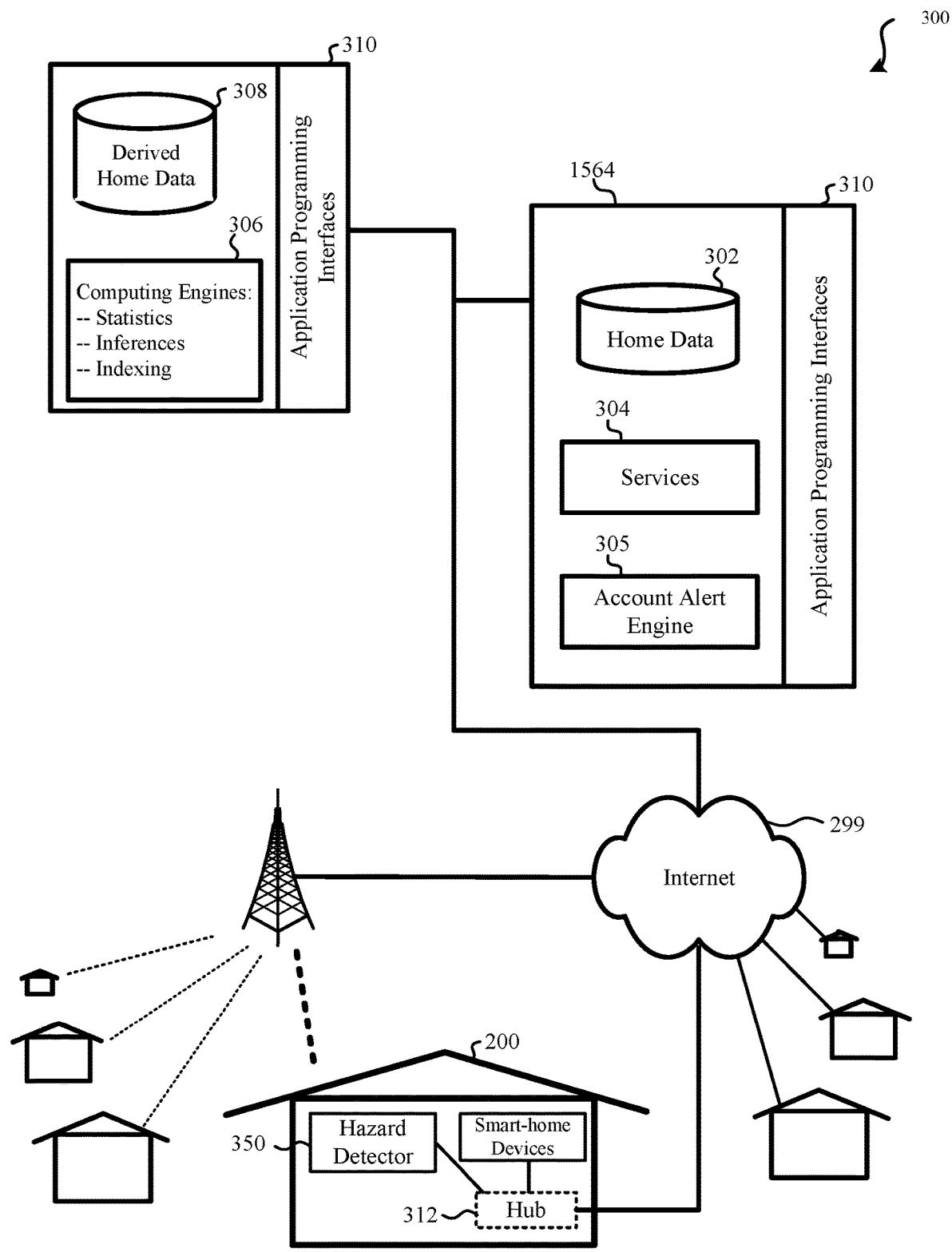
FIG. 3 illustrates a network-level view of an extensible devices and services platform with which a plurality of smart-home environments can be integrated.

FIG. 3 illustrates a network-level view of an extensible devices and services platform 300 with which a plurality of smart-home environments, such as smart-home environment 200 of FIG. 2, can be integrated. The extensible devices and services platform 300 includes cloud-computing system 264, which may include system 100 of FIG. 1. Each of the intelligent, network-connected devices from FIG. 2 may communicate with cloud-computing system 264. For example, a connection to the Internet 299 can be established either directly (for example, using 3G/4G connectivity to a wireless carrier), through a hubbed network 312 (which can be a scheme ranging from a simple wireless router, for example, up to and including an intelligent, dedicated whole-home control node), or through any combination thereof.

Although in some examples provided herein, the devices and services platform 300 communicates with and collects data from the smart devices of smart-home environment 200 of FIG. 2, it should be appreciated that the devices and services platform 300 communicates with and collects data from a plurality of smart-home environments across the world. For example, cloud-computing system 264 can collect home data 302 from the devices of one or more smart-home environments, where the devices can routinely transmit home data or can transmit home data in specific instances (e.g., when a device queries the home data 302). Thus, the devices and services platform 300 routinely collects data from homes across the world. As described, the collected home data 302 includes, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, etc.

Cloud-computing system 264 can further provide one or more services 304, which may include the functionality of system 100 of FIG. 1. The services 304 can include, e.g., software updates, resident monitoring, customer support, sensor data collection/logging, remote access, remote or distributed control, or use suggestions (e.g., based on collected home data 302 to improve performance, reduce utility cost, etc.). Data associated with the services 304 can be stored at cloud-computing system 264 and cloud-computing system 264 can retrieve and transmit the data at an appropriate time (e.g., at regular intervals, upon receiving a request from a user, etc.).

As part of services 304, user accounts may be maintained by the cloud-computing system 264. The user account may store subscription information, billing information, registration information, user preferences, and/or other data associated with various smart-home devices, such as one or more hazard detectors, installed within a structure that is linked with a user account. Occasionally, attention of a user to his or her user account may be requested. In response to a query from hazard detector 350 (or other smart-home device), a message may be transmitted by the cloud-computing system 264 to hazard detector 350 (which may represent any of the previously described hazard detectors) indicating that a status output by hazard detector 350 should indicate that a user is requested to log in to his or her user account. Further detail regarding the requested log may be transmitted by service 304 to hazard detector 350. For instance, the reason for the requested login may be expired payment information (such as an expired credit card). The user can request detail on a status output by hazard detector 350, which may be presented to the user as a color and animation output via a light of hazard detector 350. The request for detail may be by performing a gesture within the vicinity of hazard detector 350. A spoken message may then be output by hazard detector 350 indicating that the user is requested to log in to his account and may also indicate the reason of the payment information needing to be updated. As such, a status check performed by hazard detector 350 may not only check the status of hazard detector 350 itself, but also the state of a remotely-maintained user account.

As illustrated in FIG. 3, an embodiment of the extensible devices and services platform 300 includes a processing engine 306, which can be concentrated at a single server or distributed among several different computing entities without limitation. The processing engine 306 can include computerized engines (e.g., software executed by hardware) configured to receive data from devices of smart-home environments (e.g., via the Internet 299 or a hubbed network), to index the data, to analyze the data and/or to generate statistics based on the analysis or as part of the analysis. The analyzed data can be stored as derived home data 308.

Results of the analysis or statistics can thereafter be transmitted back to the device that provided home data used to derive the results, to other devices, to a server providing a webpage to a user of the device, or to other non-device entities. For example, use statistics, use statistics relative to use of other devices, use patterns, and/or statistics summarizing sensor readings can be generated by the processing engine 306 and transmitted. The results or statistics can be provided via the Internet 299. In this manner, the processing engine 306 can be configured and programmed to derive a variety of useful information from the home data 302. A single server can include one or more engines.

In some embodiments, to encourage innovation and research and to increase products and services available to users, the devices and services platform 300 exposes a range of application programming interfaces (APIs) 310 to third parties, such as charities, governmental entities (e.g., the Food and Drug Administration or the Environmental Protection Agency), academic institutions (e.g., university researchers), businesses (e.g., providing device warranties or service to related equipment, targeting advertisements based on home data), utility companies, and other third parties. The APIs 310 may be coupled to and permit third-party systems to communicate with cloud-computing system 264, including the services 304, the processing engine 306, the home data 302, and the derived home data 308. For example, the APIs 310 allow applications executed by the third parties to initiate specific data processing tasks that are executed by cloud-computing system 264, as well as to receive dynamic updates to the home data 302 and the derived home data 308.

Account alert engine may serve to determine whether a hazard detector should provide an indication that the user's account requires attention. For instance, account alert engine 305 may periodically assess the state of a user's account, such as whether settings need updating, whether payment information is up-to-date, whether one or more messages are pending, whether payment is due, etc. If user attention is required, upon a request being received from a hazard detector and a look-up of the user's account being performed, account alert engine may respond with an indication that the user account requires attention. Additional detail may also be provided such that if the user performs a gesture or otherwise requests additional detail, such detail can be provided, such as via an auditory message. If user attention is not required, upon a request being received from a hazard detector and a look-up of the user's account being performed (e.g., by determining an account associated with the hazard detector from which the request was received), account alert engine may respond with an indication that the user account does not require attention.

Figure 4:
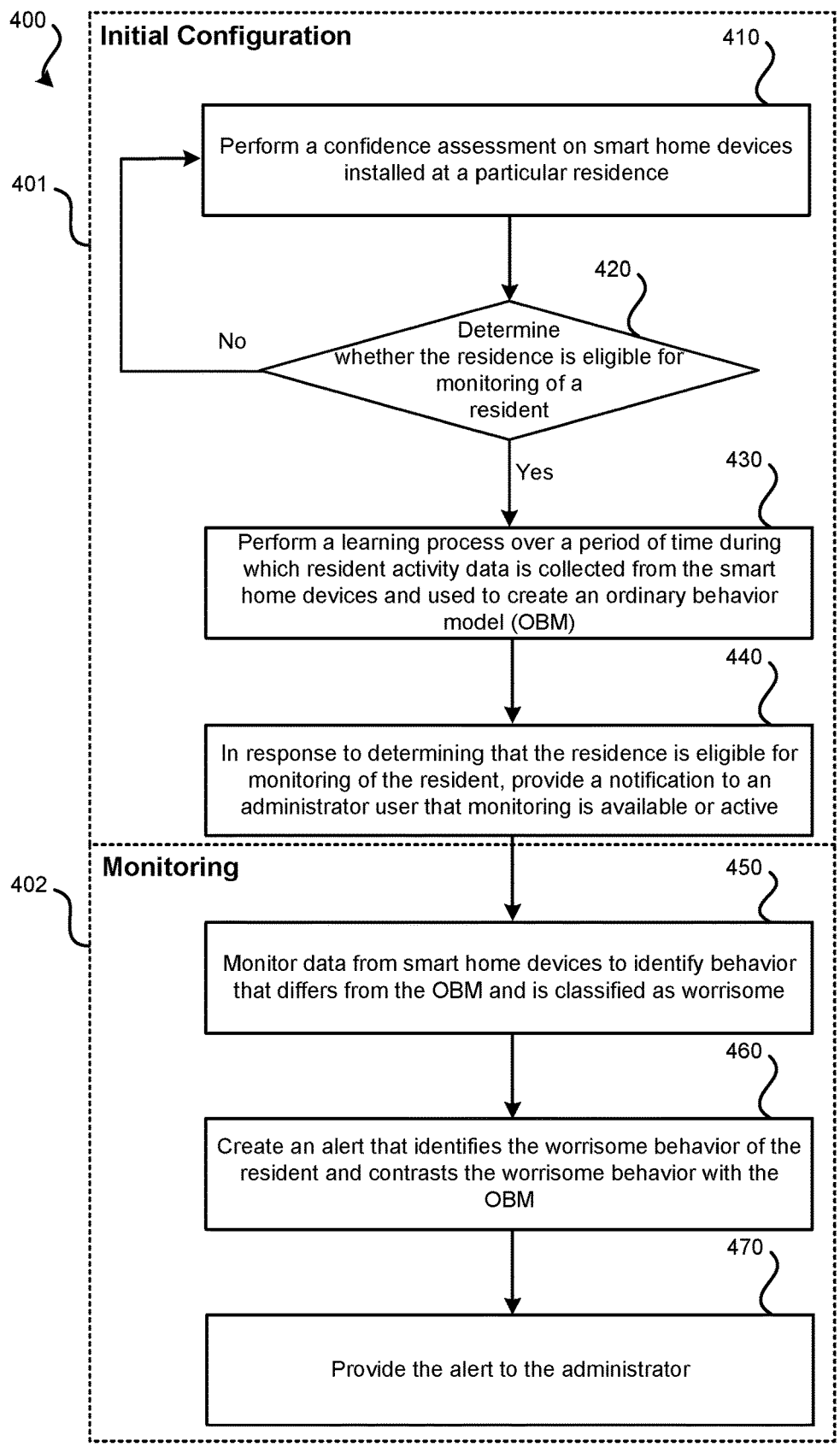
FIG. 4 illustrates an embodiment of method for performing a confidence assessment of whether a suite of smart home devices can effectively monitor an environment for the behavior pattern of a resident and for monitoring the home environment following the confidence assessment.

FIG. 4 illustrates an embodiment of method 400 for performing a confidence assessment of whether one or more smart home devices located at a residence can effectively monitor a home environment for the behavior pattern of a resident and for monitoring the resident within the home environment following the confidence assessment. Method 400 may be performed using system 100, which may be part of cloud computing system 264 of FIG. 2. Each step of method 400 may be performed by a smart home device and/or a cloud computing system that performs the functions of system 100 of FIG. 1.

As part of an initial configuration process 401, blocks 410-440 may be performed. At block 410, a confidence assessment on smart home devices located at a particular residence may be performed. Each of these smart home devices may be required to be linked with a single user account. The confidence assessment of block 410 may be used to determine if the residence is eligible for monitoring of a resident of a residence. The confidence assessment may include analyzing the number of smart home devices, the types of smart home devices, the locations of smart home devices, a questionnaire completed by an administrator or resident, etc. Further detail regarding the confidence assessment is provided in relation to method 500 of FIG. 5.

At block 420, as a result of the confidence assessment of block 410, a determination may be made as to whether the residence and the one or more residents who live at the residence are eligible for monitoring. The determination of block 420 may be performed by comparing a confidence metric calculated at block 410 with a confidence threshold value that is predefined. Only if the confidence is above the confidence threshold may monitoring of a resident be available. Below such a confidence threshold it may be assumed that monitoring would provide too many false positives of abnormal behavior or missed abnormal behaviors of the resident. By maintaining at least a minimum confidence threshold, a quality of service for the notifications provided to an administrator can be maintained.

If, at block 420, it is determined that the residence is not eligible for monitoring, occasionally, the confidence assessment may be performed again to reassess. For example, the confidence assessment may be performed again if one or more additional smart home devices are added to the residence and linked with the user account. Block 430 may be performed if at block 420 it is determined that the residence is eligible for monitoring. At block 430, a learning process may be performed over a period of time. During this period of time, activity data indicative of the resident's behavior is collected from the one or more smart home devices that may be linked with a single user account and are installed at the residence. This activity data may be used to construct an ordinary behavior model (OBM). The OBM may indicate behaviors of the resident that are expected to be performed regularly and can be accurately monitored using the smart home devices installed within the residence. Therefore, the behaviors included as part of the ordinary behavior model may vary depending on the installed smart home devices and the behavior patterns of the resident. Table 1 provides an example of an OBM:

TABLE 1

| Behavior | Start Time | End Time |
|---|---|---|
| Resident rises from Bed | 7:15 AM | 8:40 AM |
| Detect movement in kitchen | 8:20 AM | 10:15 AM |
| Activate at least one appliance in residence | 9:15 AM | 4:27 PM |
| Periodically detect movement within residence when resident is home | 8:20 AM | 10:15 PM |
| Resident goes to bed | 9:17 PM | 10:43 PM |

As indicated above, various behaviors may not be included in the OBM if a smart home's devices are not present to monitor such a behavior. For example, determining whether at least one appliance is activated in the residence may not be possible unless some or all of the appliances are smart appliances or are connected with a smart outlet. In such an instance, such a behavior may not be included as part of the OBM. Behaviors may only be included in the OBM if the behavior is regularly performed and is typically performed within a range of times. For example, over the course of the month, a resident may be monitored as part of block 430 as rising between 7:30 and 8:30 AM. As part of the OBM, a small amount of buffer time may be added to account for minor variations and the entry as indicated in Table 1 may be included in the OBM. If the behavior is detected as being performed, but is performed erratically or not regularly, the behavior may not be included as part of the OBM because it may not be reliable in determining if the resident is behaving normally. In some embodiments, an OBM may detail the general sense of activity in a home. Such a model may capture both common activity and uncommon activity. By having a model of all forms of activity, the OBM can be used to determine to what extent an activity is normal or abnormal.

In Table 2, an alternate embodiment of an OBM is presented. In some embodiments, rather than an OBM defining an expected start and stop time of various behaviors, the OBM may define whether a particular activity is likely or unlikely for a particular time period. The change in likelihood may be continuous with time rather than occurring at discrete times as indicated in Table 2. In some embodiments, different time periods may be associated with different behaviors. In Table 2, a "very unlikely" behavior may correspond to less than a 10% chance of that activity occurring; an "unlikely" behavior may correspond to less than a 50% of that activity occurring; a "likely" behavior may correspond to a more than 50% of that activity occurring; and a "very likely" behavior may correspond to at least a 90% chance of that behavior occurring.

TABLE 2

| Behavior | Time Period 1 | Time Period 2 | Time Period 3 | Time Period 4 | Time Period 5 |
|---|---|---|---|---|---|
| Movement activity at residence | Before 6 AM/ unlikely | 6 AM-8 AM/ Likely | 8 AM to 6 PM/ unlikely | 6 PM to 11 PM/ very likely | After 11 PM/ unlikely |
| Movement outside geofence (e.g., defining residence and/or local area around residence) | Before 6 AM/ very unlikely | 6 AM-8 AM/ unlikely | 8 AM to 6 PM/ likely | After 6 PM/ unlikely | |

In some embodiments, creation of the OBM may be performed as part of block 410. The successful creation of an OBM that can monitor at least some behaviors of a resident may be a necessary condition of the confidence assessment. In some embodiments, the number of behaviors that can be monitored and the narrower the time range that can be established for performance of the behavior by the resident may affect the calculated confidence metric. That is, the greater number of behaviors that can be included in the OBM, the smaller the time ranges for the behaviors, and/or the ability to label an activity as likely or unlikely, the greater the confidence metric may be increased.

Creation of the OBM may be performed over a sufficient period of time, such as a week or month, that slightly varying behaviors by the resident can be detected. For instance, a resident may rise later on weekend days and may also tend to stay up later on weekend nights. In some embodiments, an administrator or resident may be able to provide input that directly affects the OBM, such as by directly inputting when the resident typically wakes up or goes to bed.

At block 440, in response to the OBM being successfully created, monitoring of the resident may be initiated. Such initiation may include a notification being provided to the administrator indicating that monitoring is now active. In some embodiments, the administrator may now be given the option to enable such monitoring. In some embodiments, at this stage, the resident may be required to provide input via a user account of the resident that monitoring is permissible. In other embodiments, such a permission may have been provided as part of or prior to blocks 410 and/or 430 being performed. Following block 440, method 400 may transition from the initial configuration process 401 to monitoring process 402.

In some embodiments, the initial configuration may include monitoring the resident using the various installed smart home devices present at the residence. This monitoring may result in the generation of a body of trial monitoring data. The duration of the trial time period may be sufficient in length to capture multiple days or multiple repetitions of a particular day of the week. For instance, a trial time period of four weeks would capture how the resident behaves on four Mondays and four Saturdays. A predefined threshold criterion may be set that defines a threshold percentage of the day that the trial data can exclusively be used to track the location of the resident within or in the immediately vicinity (e.g., in the residence's yard and/or courtyard) of the residence, such as at least: 50%, 60%, 75%, 80%, 85%, 90%, 95%, 97%, or 99%. It should be understood that at block 420, in some instances, a determination may be made that the smart home devices present in the residence may not be sufficient in type, number, and/or location to sufficient track and monitor the resident through the resident's daily and/or day-of-the-week specific activity for at least the predefined threshold criterion. In some embodiments, the predefined threshold criterion may additionally or alternatively be indicative of a percentage of each day that a resident's heartrate and/or breathing rate can be monitored based on (exclusively) the received trial monitoring data. In some embodiments, the trial period of time is at least: 7 days, 14 days, 21 days, or 28 days. In some embodiments, default trial time period is seven days. Such a confidence assessment may be carried out with little or no user input as part of the confidence assessment. In other embodiments, the trial time period is defined by the administrator. The longer the duration of the trial time period, the greater the confidence and/or more accurate the confidence assessment may be.

At block 450, data from the one or more smart home devices located within the residence and, possibly, linked with a single user account, may be monitored. This data may be monitored for indications of behavior of the resident that are outside of the behavioral norms indicated by the OBM. Therefore, multiple types of data may be monitored, including movement data from a motion sensor, audio from a microphone, video indicative of the resident being present at a location or moving a location, interactions with smart home devices, such as smart appliances or smart home assistants, and/or location data from an electronic device that a resident tends to carry, such as a smartphone. Such location data may be used for geofencing (e.g., to determine if the resident is within the residence, outside near the residence, or away from the residence).

Simply because a behavior does not fall within the norms established by the OBM does not mean it is necessarily "worrisome" behavior. Whether a behavior is classified as "worrisome" may require the behavior to: 1) fall a threshold amount outside the norms established as part of the OBM; and 2) be a behavior that has been selected by the administrator as requiring a notification. Regarding falling outside of the norms established as part of the OBM, there may be required that at least a threshold difference between the OBM and the observed behavior be present. For instance, if a wake up time of the resident of 7:12 AM is observed and the time period indicated as normal within the OBM starts at 7:15 AM, an administrator may not want to be notified. The administrator or operator of system 100 may define a threshold difference time between the time period established as part of the OBM and the observed behavior for the administrator to be notified, such as between 0 minutes and 120 minutes. Further, the behavior may be required to be selected as a behavior desired to be monitored. For example, an administrator may wish to monitor wake times of the resident but not the times when the resident goes to bed or moves within the residence (e.g., the resident may leave home frequently). The administrator or resident may select, such as via a mobile application, which behaviors indicated in the OBM are eligible for a notification. In some embodiments, the service provider of system 100 may define default behaviors that are eligible for notifications and default other behaviors to not be eligible for notifications.

If no worrisome behavior is identified, block 450 may continue to be performed to monitor behaviors of the resident. As block 450 is being performed, the OBM may continue to be updated to accommodate shifting behavior patterns over time. For example, the resident may tend to go to bed earlier in winter.

Figure 7:
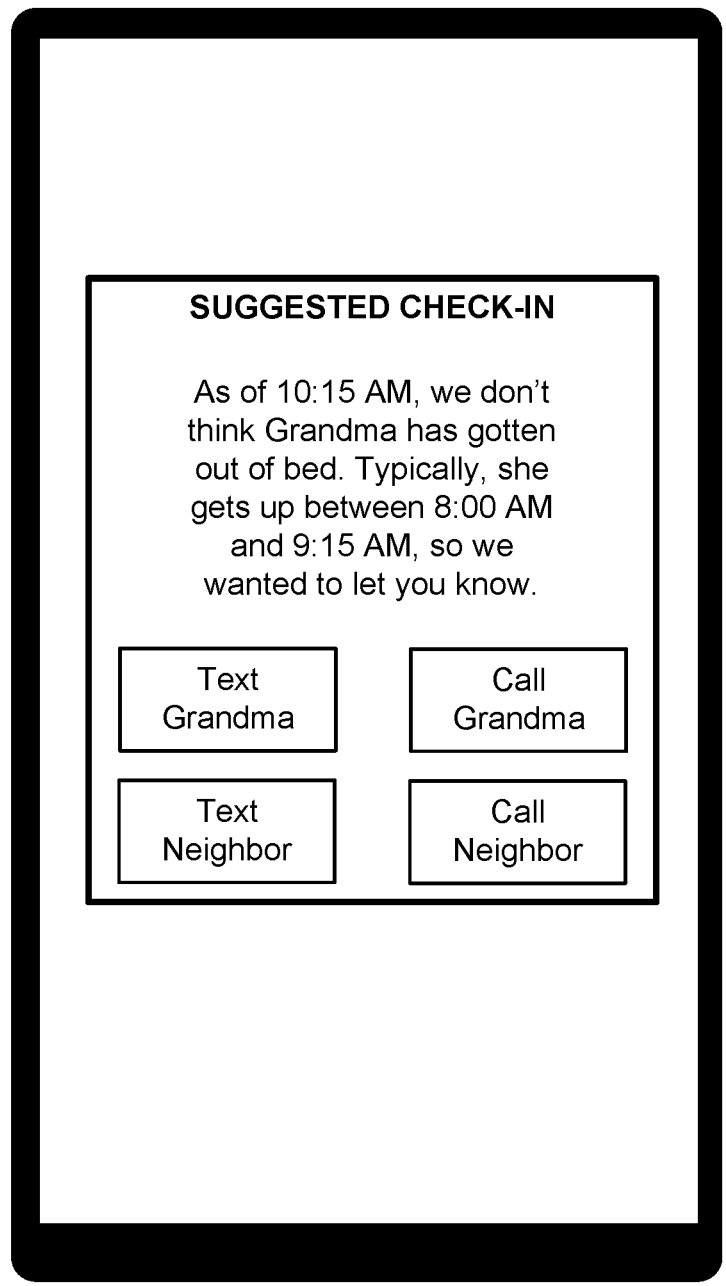
FIG. 7 illustrates an embodiment of a notification that can be provided to an administrator based on the behavior of the resident in the environment being monitored.

At block 460, if a behavior is sufficiently beyond the bounds of the OBM and the behavior corresponds to a behavior of which the administrator has selected to be notified, a notification may be created at block 460. The notification may include text, audio, and/or video. The notification may indicate: 1) specifics of the observed behavior that is sufficiently outside the OBM by at least a threshold amount; and 2) the normal behavior that the observed behavior is being compared with. For example, a notification may indicate that a resident is still in bed at 10:15 AM, but typically gets out of bed between 8:00 AM and 9:15 AM. At block 470, the notification may be sent to the administrator, such as via text, a push notification, or within an application. In other embodiments, a call or email may alternatively or additionally be used. An example of such a notification is illustrated in FIG. 7. In some embodiments, a version of the notification is first provided to the resident to allow them an opportunity to respond or indicate he is OK, such as via text, a phone call, via a smart home assistant, or via a smartphone application. In some embodiments, in response to a notification such as a voice prompt, the resident may be able to speak to a smart home device installed in the residence to indicate that he is OK. Additionally or alternatively, a resident may be permitted to perform a gesture or provide another form of input to a smart home device in order to signal that the resident is OK and does not require any other person to be notified. If no response is received to the notification is received from the resident, the administrator may be notified. FIG. 7 illustrates an embodiment of a smartphone 700 presenting a push message including a notification. This notification provides the administrator with the option of contacting the resident (in this case, "Grandma") via either text or a voice call or contacting a neighbor of the resident (e.g., to check on the resident).

In some embodiments, the action an administrator takes in response to a notification may be used to fine-tune the application of the OBM. If an administrator repeatedly takes no action after a particular type of notification, sensitivity may be decreased such that fewer of such notifications are provided. Additionally or alternatively, an administrator may have an option within an application's user interface to indicate that too many alerts (or too few alerts) are being received, possibly for a particular type of behavior. The application of the OBM may be refined in response to such input.

Figure 5:
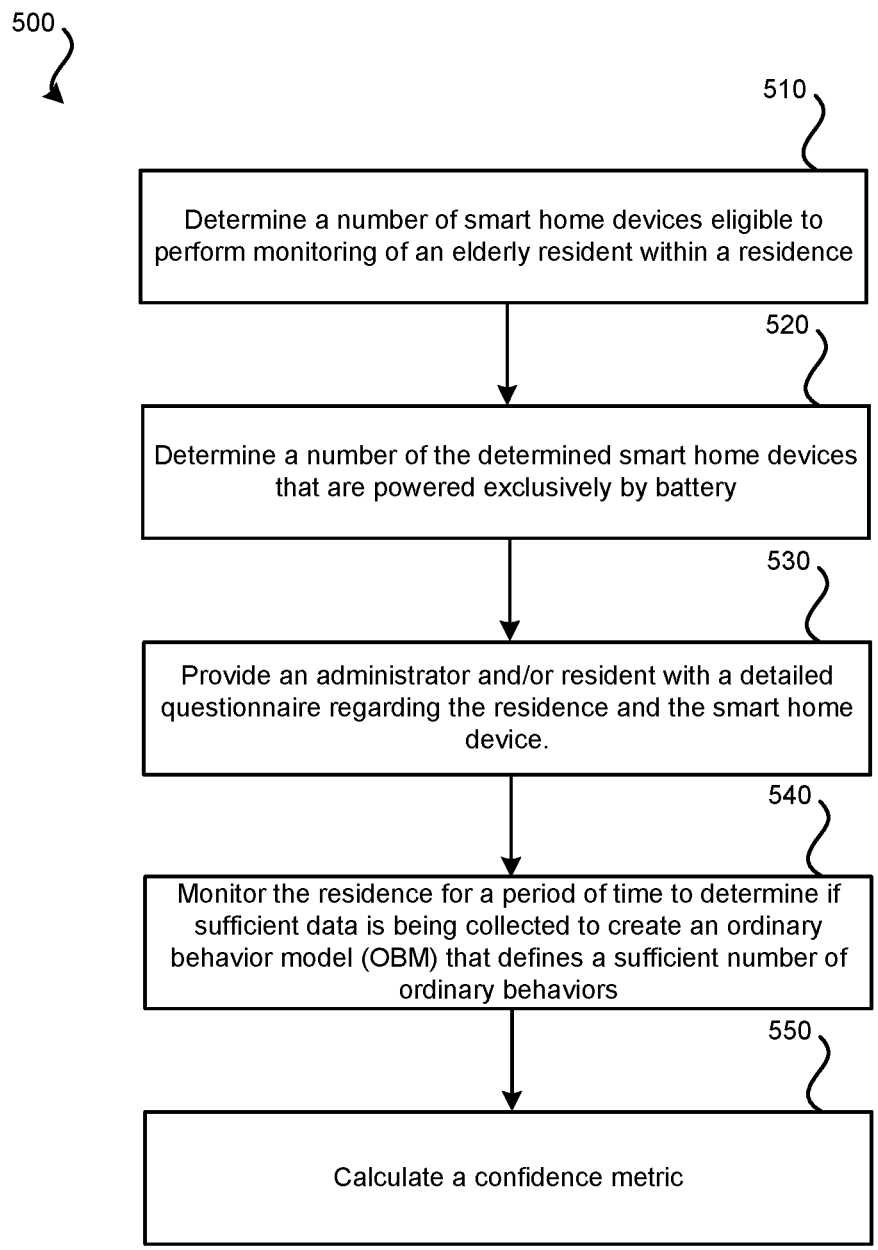
FIG. 5 illustrates an embodiment of a method for performing a confidence assessment of whether a suite of smart home devices can effectively monitor a home environment for the behavior pattern of a resident.

FIG. 5 illustrates an embodiment of a method 500 for performing a confidence assessment of whether a suite of smart home devices can effectively monitor a home environment for the behavior pattern of an elderly occupant. Method 500 may be performed as part of block 410 of method 400. Therefore, method 500 may be performed using system 100, which may be part of cloud computing system 264 of FIG. 2. Each step of method 500 may be performed by a smart home device and/or a cloud computing system that performs the functions of system 100 of FIG. 1.

At block 510, a number of smart home devices that are present within the residence of the resident to be monitored may be determined. Each of these smart home devices may be linked with a common user account at a cloud-based server. For a smart home device to be identified as eligible, the smart home device may be required to have at least one sensor that can monitor for the presence of a person (e.g., a motion sensor, microphone, camera). Additionally or alternatively, to be eligible, a resident may be required to have a smartphone capable of location reporting.

At block 520, a number of the smart home devices identified at block 510 may be identified as being powered exclusively by battery (or some other form of energy-storage component). If a smart home device is powered exclusively by battery, the amount of monitoring of the resident and/or the frequency of data reporting to a remote device via wireless communication that the smart home device can perform may be decreased due to power requirements. For example, a battery-powered device may only periodically or occasionally communicate wirelessly with a cloud-based server or other smart home device in order to save power. Movement observed by a battery-powered device may not be reported as frequently as movement detected by a line-powered smart home device. The number of the smart home devices that are powered exclusively by battery may be identified from the number of smart home devices determined at block 510. The greater the percentage of battery-powered devices of the total number of smart home devices, the lower a confidence metric may be. In some embodiments, at least one smart home device that regularly observes movement of the resident may be required to be line powered.

In some embodiments, at block 520 the analysis may be based on "power-constrained" devices, rather than just exclusively battery-powered devices. Some power-constrained devices may obtain power from a source other than a battery, but may still have access to a finite amount of power at a given time, such as due to the way the device receives power. For example, a smart thermostat may "steal" power from HVAC control and communication wires. The amount of power that can be drawn from these wires may be significantly limited and may, thus, place the smart thermostat under significant power restrictions. Power-constrained devices can include devices that are powered exclusively by battery.

At block 530, an administrator and/or the resident may be provided with a questionnaire. The questionnaire may be provided via an application executed by a mobile device the administrator or the resident. Answers to the questions of the questionnaire may determine whether the residence is eligible for monitoring of the resident and/or may affect the confidence metric computed as part of method 500. The following questions are examples of questions that may be posed to the administrator or resident as part of the questionnaire: (1) Do you [or the resident, as applicable] live alone?; (2) Do you have any pets, such as a cat or dog?; (3) Is [smart home device] located in the bedroom you sleep in?; (4) Do you have a smartphone that you tend to carry when you go out?; (5) Do you consent to being monitored by [administrator]?; and (6) How many square feet is the residence? The previous questions are only examples of possible questions that may be asked as part of a questionnaire. If question (1) is answered in the negative, the confidence metric may be decreased or monitoring may not be available; if answered positively, the confidence metric may be increased and/or monitoring may be available. If question (2) is answered in the negative, the confidence metric may be increased and/or monitoring may be available; if answered positively, the confidence metric may be decreased and/or monitoring may not be available. Question (3) may be to determine if a specific smart home device is located in a bedroom used by the resident. For instance, a requirement of monitoring may be a smart home device with a motion sensor in or near the resident's bedroom. Via another interface, it may already have been specified that a smart home device is in a type of room (e.g., bedroom), but it may be unknown if it is located in the primary bedroom where the resident tends to sleep. Question (4) may be used to determine if a smartphone can be used for geo-fencing purposes. That is, determine when the resident has left the residence. Question (5) may be used to determine if the resident consents to monitoring by a person designated as the administrator, such as an adult child. Question (6) may be used to determine if sufficient smart home devices are present in the home to provide an accurate picture of the behavior of the resident.

At block 540, in some embodiments, the residence may be monitored for a period of time to determine if sufficient data is being collected to create an accurate OBM. For instance, if the data collected by the smart home devices cannot reliably be used to determine a rise time and bed time for the resident, monitoring may be blocked or the confidence metric may be decreased. Block 540 may be performed as part of block 430. It may be required that a sufficient number of ordinary behaviors be identified for inclusion in the OBM. For instance, at least one or two behaviors that occur daily may be required to be repeatedly detectable, such as the resident waking up, moving about the residence, or going to bed.

At block 550, a confidence metric may be calculated based on block 510-540. Different point values (either positive or negative) may be assigned to the total number of smart home devices, the number of smart home devices that are battery powered, the individual answers to the questionnaire and the number of behaviors that can be accurately detected for inclusion in the OBM. Certain answer or conditions may preclude any form of monitoring regardless of any confidence metric calculation. For example, if the resident does not live alone, monitoring may not be available. If there is not a probation on monitoring due a questionnaire answer or a result of a particular block, the confidence metric may be compared to a threshold confidence value at block 420 of method 400.

If some non-zero number of exclusively battery-powered devices are to be used for monitoring a resident, code may be provided to and/or activated at the battery-powered smart home device that modifies its communication schedule with other smart home devices and/or a cloud-computing system, such as system 100. If certain behavior patterns are observed (or not observed) by the battery-powered device, the battery-powered device may be instructed to report the data other than at its periodic transmission schedule. For instance, movement or non-movement that conflicts with a locally-stored version of the OBM by the battery-powered device may trigger an immediate or ahead-of-schedule communication with system 100. For instance, a smart smoke detector may typically only connect to a cloud-based server once every 23 hours. However, instructions in the form of code may be provided to the smart smoke detector that if movement is not sensed during one or more time periods, it should be report the lack of movement immediately or at least sooner than scheduled for communication with the cloud-based server. Occasionally, the battery-powered device may be provided with updated instructions defining when it should immediately or ahead of schedule report movement measurements, such as when a conflict with a provided version of the OBM is present.

Figure 6:
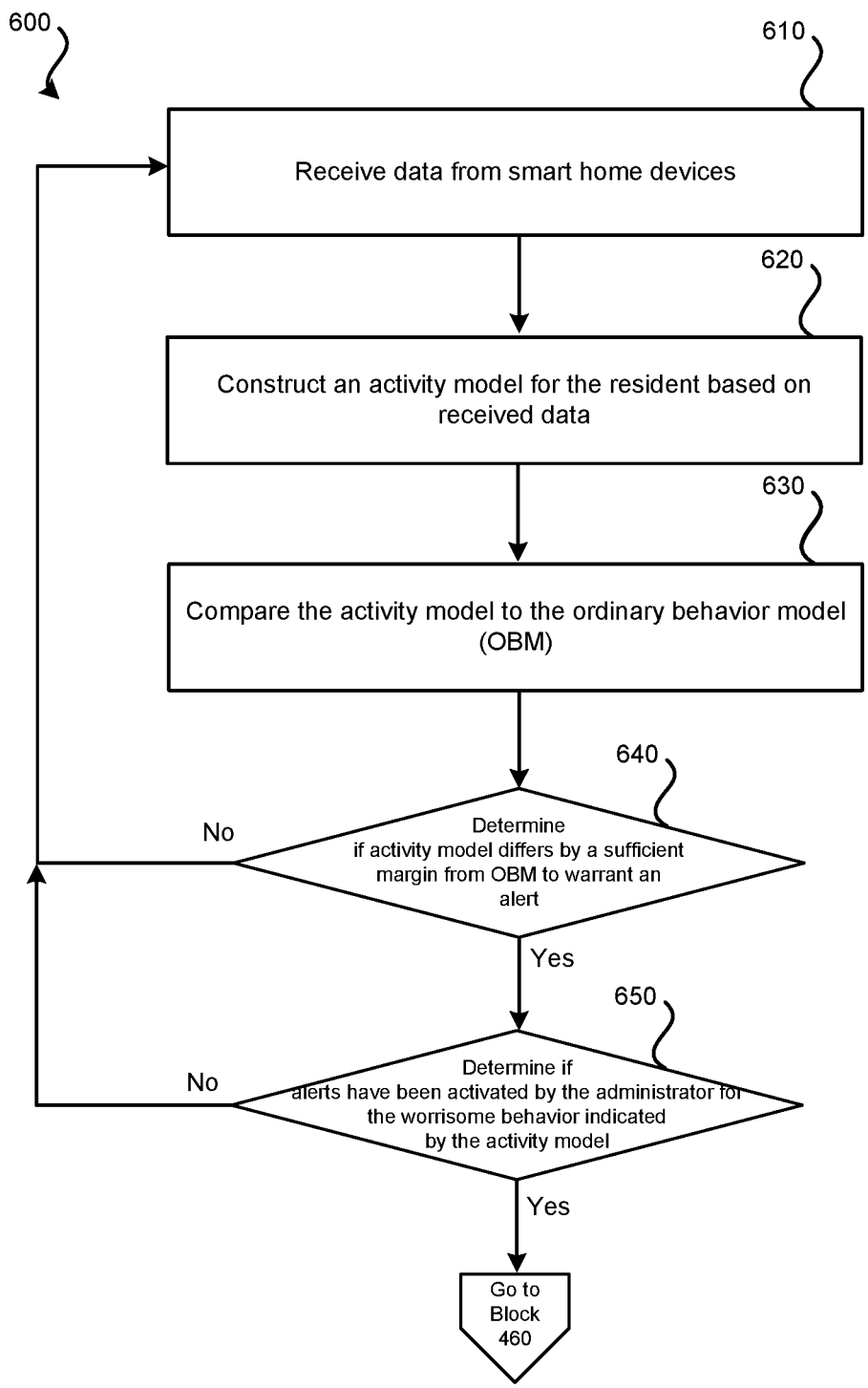
FIG. 6 illustrates an embodiment of a method for monitoring a home environment to determine if a resident's behavior is sufficiently worrisome to warrant an administrator being notified.

FIG. 6 illustrates an embodiment of a method for monitoring a home environment to determine if a resident's behavior is sufficiently worrisome to warrant an administrator being notified. Method 600 may be performed as part of block 450 of method 400. Therefore, method 600 may be performed using system 100, which may be part of cloud computing system 264 of FIG. 2. Each step of method 600 may be performed by a smart home device and/or a cloud computing system that performs the functions of system 100 of FIG. 1.

At block 610, data may be received from the various smart home devices being used to monitor the resident at the residence. At block 620, an activity model for the resident may be created based on the received data from the one or more smart home devices. While an OBM summarizes or models a resident's ordinary and/or out-of-the-ordinary behavior over time, the activity log may be for a defined period of time, such as a particular day. For instance, based on motion data from multiple smart home devices (e.g., a smoke detector within the bedroom and a security camera in the living room), a time at which the resident rose from bed may be indicated in the activity log. Therefore, an activity log may store determinations that correspond to behaviors for which the OBM has an entry.

At block 630, the activity model may be compared with the OBM to identify any part of the activity model that differs from the normal ranges indicated in the OBM. At block 640, a determination may be made as to whether one or more items within the activity model differs by a sufficient margin to warrant a notification being sent. Threshold margins may be established for the behaviors of the OBM or time ranges of the OBM itself may be expanded to create a margin. If the behavior of the activity model exceeds the margin or the expanded time range of the OBM, method 600 may proceed to block 650; otherwise, method 600 may proceed back to block 610 and continue monitoring received data and further constructing the activity model.

At block 650, it may be determined if the administrator and/or resident has enabled notifications for the particular worrisome behavior of the activity model that does not match with the OBM. If enabled, method 600 may proceed to block 460 of method 400. If notifications are not enabled for the particular behavior of the activity model that does not match with the OBM, the notification may be logged and accessible via a mobile device application of the administrator and/or resident.

The OBM of the resident being monitored is discussed in one or more embodiments above in terms of resident location within the residence and/or interactions of the resident with their surrounding environment (e.g., activating an appliances), which have been found to represent phenomena that, advantageously, are expository or "telling" of the overall state of the resident while also being readily measurable by a variety of smart-home devices. However, it is to be appreciated that the scope of the present teachings includes measuring, using appropriate sensors, any of a variety of extrinsic and intrinsic states of the resident representative of their well-being, including, but not limited to: medical well-being factors such as heartbeat, breathing rate, blood glucose levels, blood oxygen levels, body temperature, quality of speech, quality of sleep, etc.; psychological well-being factors such as how often the resident interacts with their pets, talks to visitors or persons at the other end of the phone line or video conference, plays video games, etc.; and lifestyle well-being factors ranging from how often they change their clothing to how regularly they do the dishes. For some embodiments, the user/administrator can select from a menu of such observable characteristics to be included in the ordinary behavior model, and, as further smart-home devices are added (e.g., the addition of a remote heartbeat monitoring system), items can be added to the menu.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for monitoring a resident, the method comprising:
performing a confidence assessment to determine whether a plurality of smart home devices present at a residence is sufficient to monitor for abnormal behavior of the resident at the residence with at least a threshold level of confidence, wherein:
the resident resides at the residence;
performing the confidence assessment comprises calculating a confidence metric; and
the confidence metric is based on a first number of the plurality of smart home devices that are eligible to participate in monitoring the resident for abnormal behavior;
the confidence metric is further based on a second number of the plurality of smart home devices that are eligible to participate in the monitoring the resident for abnormal behavior and are power constrained; and
the confidence metric is increased as part of the confidence assessment in response to a repeated pattern of behavior being detected based on data from the plurality of smart home devices;
determining that the residence is eligible for monitoring of the resident based on the confidence metric;
performing a learning process over a period of time during which resident activity data is collected from the plurality of smart home devices and used to create an ordinary behavior model; and
monitoring data received from the plurality of smart home devices to identify data indicative of behavior considered unusual for the resident based on the ordinary behavior model.

2. The method for monitoring the resident of claim 1, wherein the confidence assessment comprises:
determining a type of each smart home device of the plurality of smart home devices that can assist in monitoring for abnormal behavior of the resident at the residence.

3. The method for monitoring the resident of claim 2, wherein the confidence assessment comprises determining a number of video cameras that can assist in monitoring for abnormal behavior of the resident at the residence.

4. The method for monitoring the resident of claim 1, wherein the confidence assessment comprises:
providing a questionnaire via a mobile device; and
receiving a plurality of answers to the questionnaire, wherein the threshold level of confidence is based at least in part on the received plurality of answers to the questionnaire.

5. The method for monitoring the resident of claim 4, wherein the questionnaire requests one or more types of worrisome scenarios that involve the resident for which an administrator desires to be notified.

6. The method for monitoring the resident of claim 1, further comprising:
activating a process at each exclusively battery-powered smart home device of the plurality of smart home devices that defines one or more rules indicative of when data indicative of a behavior of the resident should be transmitted.

7. The method for monitoring the resident of claim 6, wherein at least some of the plurality of smart home devices are selected from the group consisting of: a smart home smoke detector; a smart home carbon monoxide detector; a smart indoor security camera; a smart outdoor security camera; a smart thermostat; a smart home assistant device; a smart security system; a smart window/door sensor; a smartphone; and a smart doorbell device.

8. A system for monitoring a resident, the system comprising:
a plurality of smart home devices installed within a residence;
an application executed by an administrator device; and
a cloud-based host system comprising:
one or more processors; and
a memory communicatively coupled with and readable by the one or more processors and having stored therein processor-readable instructions which, when executed by the one or more processors, cause the one or more processors to:
perform a confidence assessment to determine whether the plurality of smart home devices present at a residence is sufficient to monitor for abnormal behavior of the resident at the residence with at least a threshold level of confidence, wherein:
the resident resides at the residence;
the confidence assessment comprises calculating a confidence metric based on a first number of the plurality of smart home devices that are eligible to participate in monitoring the resident for abnormal behavior and a second number of the plurality of smart home devices that are eligible to participate in the monitoring the resident for abnormal behavior and are power constrained; and
the confidence metric is increased as part of the confidence assessment in response to a repeated pattern of behavior being detected based on data from the plurality of smart home devices;
determine that the residence is eligible for monitoring of the resident based on the confidence metric;
perform a learning process over a period of time during which resident activity data is collected from the plurality of smart home devices and analyzed to create an ordinary behavior model; and
monitor data received from the plurality of smart home devices to identify data indicative of behavior considered unusual for the resident based on the ordinary behavior model.

9. The system for monitoring the resident of claim 8, wherein the processor-readable instructions which, when executed, cause the one or more processors to perform the confidence assessment further comprises processor-readable instructions which, when executed, cause the one or more processors to:
determine a type of each smart home device of the plurality of smart home devices that can assist in monitoring for abnormal behavior of the resident at the residence.

10. The system for monitoring the resident of claim 9, wherein the processor-readable instructions which, when executed, cause the one or more processors to perform the confidence assessment further comprises processor-readable instructions which, when executed, cause the one or more processors to determine a number of video cameras that can assist in monitoring for abnormal behavior of the resident at the residence.

11. The system for monitoring the resident of claim 8, wherein the processor-readable instructions which, when executed, cause the one or more processors to perform the confidence assessment further comprises processor-readable instructions which, when executed, cause the one or more processors to:

provide a questionnaire via a mobile device; and receive a plurality of answers to the questionnaire, wherein the threshold level of confidence is based at least in part on the received plurality of answers to the questionnaire.

12. The system for monitoring the resident of claim 11, wherein the questionnaire requests one or more types of worrisome scenarios that involve the resident for which an administrator desires to be notified.

13. The system for monitoring the resident of claim 8, wherein the processor-readable instructions which, when executed, further cause the one or more processors to activate a process at each exclusively battery-powered smart home device of the plurality of smart home devices that defines one or more rules indicative of when data indicative of a behavior of the resident should be transmitted.

14. The system for monitoring the resident of claim 8, wherein at least some of the plurality of smart home devices are selected from the group consisting of: a smart home smoke detector; a smart home carbon monoxide detector; a smart indoor security camera; a smart outdoor security camera; a smart thermostat; a smart home assistant device; a smart security system; a smart window/door sensor; a smartphone; and a smart doorbell device.

15. A non-transitory processor-readable medium, comprising processor-readable instructions configured to cause one or more processors to:

perform a confidence assessment to determine whether a plurality of smart home devices present at a residence is sufficient to monitor for abnormal behavior of a resident at a residence with at least a threshold level of confidence, wherein:

the resident resides at the residence;

the confidence assessment comprises calculating a confidence metric;

the confidence metric is based on a first number of the plurality of smart home devices that are eligible to participate in monitoring the resident for abnormal behavior;

the confidence metric is further based on a second number of the plurality of smart home devices that are eligible to participate in the monitoring the resident for abnormal behavior and are power constrained; and the confidence metric is increased as part of the confidence assessment in response to a repeated pattern of behavior being detected based on data from the plurality of smart home devices;

determine that the residence is eligible for monitoring of the resident based on the confidence metric;

perform a learning process over a period of time during which resident activity data is collected from the plurality of smart home devices and used to create an ordinary behavior model; and monitor data received from the plurality of smart home devices to identify data indicative of behavior considered unusual for the resident based on the ordinary behavior model.

16. The non-transitory processor-readable medium of claim 15, wherein the processor-readable instructions configured to cause the one or more processors to perform the confidence assessment further comprises processor-readable instructions configured to cause the one or more processors to:

determine a type of each smart home device of the plurality of smart home devices that can assist in monitoring for abnormal behavior of the resident at the residence.

17. The non-transitory processor-readable medium of claim 16, wherein the processor-readable instructions configured to cause the one or more processors to perform the confidence assessment further comprises processor-readable instructions configured to cause the one or more processors to determine a number of video cameras that can assist in monitoring for abnormal behavior of the resident at the residence.

18. The non-transitory processor-readable medium of claim 16, wherein the processor-readable instructions configured to cause the one or more processors to perform the confidence assessment further comprises processor-readable instructions configured to cause the one or more processors to:

provide a questionnaire via a mobile device; and receive a plurality of answers to the questionnaire, wherein the threshold level of confidence is based at least in part on the received plurality of answers to the questionnaire.

* * * * *